United States Patent [19]

Brown et al.

[11] Patent Number: 5,526,957
[45] Date of Patent: Jun. 18, 1996

[54] MULTI-COMPONENT DISPENSER WITH SELF-PRESSURIZATION SYSTEM

[75] Inventors: Daniel P. Brown, Palos Park, Ill.; Michael L. Lane, Arvada, Colo.

[73] Assignee: Insta-Foam Products, Inc., Joliet, Ill.

[21] Appl. No.: 264,643

[22] Filed: Jun. 23, 1994

[51] Int. Cl.$^6$ .................................................. B65D 35/22
[52] U.S. Cl. ............................ 222/94; 222/96; 222/105; 222/136; 222/145.5; 222/386.5; 222/387; 222/389; 222/397; 222/399; 222/402.18
[58] Field of Search ...................... 222/1, 94, 95, 222/96, 105, 135, 136, 145.1, 145.5, 145.6, 386.5, 387, 389, 394, 397, 399, 402.18

[56] References Cited

U.S. PATENT DOCUMENTS

| | | | |
|---|---|---|---|
| 4,676,437 | 6/1987 | Brown | 239/414 |
| 4,679,706 | 6/1987 | Magid et al. | 222/386.5 X |
| 4,785,972 | 11/1988 | LeFevre | 222/386.5 X |
| 4,909,420 | 3/1990 | Reyner | 222/386.5 |
| 4,925,107 | 5/1990 | Brown | 239/414 |
| 5,163,584 | 11/1993 | Huber et al. | 222/145.5 X |

FOREIGN PATENT DOCUMENTS 4108586  9/1992  Germany .................................. 222/95

OTHER PUBLICATIONS

Ecopack N. V. –Belgium "Enviro Spray Systems" Product Brochure.
Quoin–Colorado "The Party Pig" Bear Dispensing System Product Brochure.

Primary Examiner—Joseph A. Kaufman
Attorney, Agent, or Firm—James T. FitzGibbon

[57] ABSTRACT

A combination chemical dispensing apparatus and dispensing gun. The apparatus includes a first master container having at least one flexible wall product container and a head space between the product container and the first master container, a gas-generating apparatus including a second master container receiving a first fluent substance and a second fluent substance in a second container and a product dispensing gun including valves for controlling liquid and gas flow therethrough, with fluid-tight connections arranged to permit fluid flow from the product container to the gun and gas flow from the second master container to the first master container and to the gun.

13 Claims, 2 Drawing Sheets

MULTI-COMPONENT DISPENSER WITH SELF-PRESSURIZATION SYSTEM

BACKGROUND OF THE INVENTION

The present invention relates generally to dispensing systems for chemical reactants, and in particular, to the combination of a self-contained, self-regulating pressure generating system and an apparatus for mixing and dispensing the individual reactive components. More particularly, in a preferred embodiment, the invention relates to a system for dispensing two separately contained, reactive liquids and causing them to flow into a mixing nozzle wherein a cross linking reaction will take place, wherein a blowing agent will cause the resins comprising the material to begin forming a chemical foam.

In a further aspect, the present invention utilizes the same gas that is used to dispense one or more liquids under pressure to entrain the foam being formed and propel it to the point of application.

In a specific embodiment, the invention relates to a system for generating carbon dioxide which serves the multiple purposes of causing a liquid hydroxyl-rich resin from one flexible walled container and an isocyanate material from a second flexible walled container, to flow to a dispensing gun having a removable mixing and dispensing nozzle. At the same time, part of the generated gas is directed through the same gun, impinging on and serving to propel the materials being mixed to the point of application. In this connection, mixture of the isocyanate or "A" component and the resin or "B" component is normally a thermosetting reaction which can also be made to generate a gas for the purpose of "blowing" the constituents into a foam. Such a foam, when being mixed with a swirling action inside a mixing and dispensing nozzle, can be directed to the outlet of a tube from which the same gas used to urge the components into the mixing chamber is discharged at atmospheric pressure. As the mix just beginning to foam impinges upon the gas stream, the being-formed foam will be picked up and propelled to a surface to which it is being applied.

In the past, successful systems for dispensing urethane foam have been produced. These include those described in U.S. Pat. No. 3,784,110 and U.S. Pat. No. 4,676,437, for example. In these systems, when the individual constituents are mixed, the heat of reaction and the lowering of pressure incident to discharge caused foaming of an emulsified gas or vapor, usually a fluorocarbon such as a "Freon." The over pressure from the dissolved gas was sufficient to propel the mixed chemicals and the being-foamed to the point of application. Many thousands of portable kits using this principle were sold, and such products were considered highly successful.

However, recent concern with the impact of fluorocarbon blowing agents and propellants on the earth's atmosphere have made it desirable to terminate the use of these propellants. It is widely believed that such propellants, when released into the atmosphere, eventually find their way to high altitudes and are incidental in the destruction of the earth's protective ozone layer.

Consequently, while the use of such propellants is now being ruled out, there are no readily available substitutes for certain of these liquid fluorocarbons that do not have other serious drawbacks. Thus, an advantage of fluorocarbon propellants was that they were able to change from liquid to vapor form at modest pressures and temperatures. Hence, they could be liquified without dangerously high pressures and yet could provide excellent expansion and propulsion potential.

While foam dispensed and blown using the fluorocarbons or chloro-fluorocarbons have had significant advantages, most or all packaged systems using such foams did suffer from the drawback of lacking regulated pressure. Thus, the dispensing rate tended to become lower with the passage of time as the effective headspace pressure in the area containing the liquids was reduced as the gasses were exhausted. A system with a self-regulating pressure arrangement would thus be advantageous for maintaining a relatively constant dispensing rate which would also be advantageous for mixing.

Other potential, readily liquefiable vapors, however, have their own drawbacks, and as a consequence, it has not been practical to use them in foam dispensing and other related applications. The propellants of the kind in question include butane and propane, for example, which are highly flammable, and which require special protection against fire and/or explosion hazards, particularly during shipment and storage.

As a result of the foregoing situation, there has been a need to mix and dispense foam-forming and other chemicals in a way that is as economical and practical as prior art practice, but without their associated drawbacks. One very advantageous propellant, for example, is carbon dioxide. Such a gas can be made to serve both the blowing or expansion requirements of foam-forming and the role of propellant.

However, because of the nature of carbon dioxide, it requires extremely high pressures to be liquified. As a consequence, while it is possible to use liquid or highly compressed carbon dioxide confined under great pressures for some dispensing application, such as for dispensing carbonated beverages, for example, this requires using high pressure containers and accurate pressure regulation systems. Thus, while $CO_2$ is an excellent propellant, pressure tanks and regulators are too expensive enough to be discarded after use. Compressed gases are also the subject of prohibitive freight rates and storage requirements. In this connection, materials which are "hazardous," either by risk of flammability or high pressure, or both, require special precautions for shipping, including special packaging, and special labeling. These products involve concomitantly high freight rates and storage practices which are inconsistent with economical throwaway packaging.

While it has been suggested that certain mixing and propellant compositions could be made at the site wherein they are to be utilized in a dispensing operation, it is also inconsistent with the purpose of providing a convenient portable dispensing apparatus to require wet chemical mixing by the foam applicators or other operators. One of the reasons for the success of low-cost packaged kits able to mix and dispense foam-making chemicals is their foolproof nature and their lack of a requirement for precise measuring on or near the job site. Another problem with generating gases, especially $CO_2$, is that gas pressure must be regulated to be practical. Foam applications usually require up to 100 psi or even much more, preferably in the 40–80 or 50–70 psi ranges.

In view of the failure of the prior art to provide a self-contained mixing and dispensing system for reactive chemicals, particularly those used to create expanded cellular plastics such as urethane foams, it is an object of the invention to provide an improved gas-generating and dispensing apparatus.

Another object of the invention is to provide a container system which includes a chemical reagents which are isolated from each other for shipment but which may thereafter be activated so as to begin generating gas for the purpose of mixing and dispensing chemical foams.

A further object of the invention is to provide a simplified, low cost system for generating propellant gases, including carbon dioxide, in which the reagents used to create the propellant gas are held separate from each other until it is desired to initiate the mixing reaction.

A still further object of the invention is to provide a gas-generating system which is inherently able to regulate the pressure of gas being generated over a significant period of time.

Yet another object of the invention is to provide a gas-generating arrangement which provides essentially self-regulated pressure in a selected range.

Another object of the invention is to provide an inherently self-regulating pressure control arrangement wherein gas pressure results from mixing two or more reactants, and wherein the system includes separate containers for each of the reactants and an arrangement of containers, passages, and fittings or the like whereby a decrease in pressure caused by using the gas causes additional gas forming chemicals to be supplied for mixing with each other so as to again increase the system pressure to a controlled level.

A further object of the invention is to provide a packaged dispensing system which includes a dispensing gun having a removable mixing and dispensing nozzle including at least two liquid inlet passages and a separate gas passage for dispensing the foam product, with the system further including sealed containers with gas-generating components and an arrangement of passage tubes and seals permitting the reactants to be mixed when desired by the user.

A still further object of the invention is to provide a combination dispensing gun and gas-generating apparatus wherein the entire package contains relatively non-toxic, non-corrosive chemicals able to be shipped at minimum expense while unpressurized, and yet being activatable upon demand to supply a regulated dispensing pressure.

The foregoing and other objects and advantages of the invention are achieved in practice by providing a combination gas-generating and liquid dispensing system with a self-regulating pressure arrangement. The invention also achieves its objects by providing a gas-generating and dispensing system that includes a master container that in turn includes one or more containers of dispensible fluent materials and is able to be pressurized by a generated gas, a generator having at least two containers with gas producing reactants separately contained therein, an arrangement of passages between the containers whereby controlled mixing of the gas-generating materials can be achieved in practice, and a dispensing gun with valves for controlling liquid and gas flow therethrough.

The manner in which the foregoing and other objects and advantages of the invention achieved in practice will become more clearly apparent when reference is made to the following detailed description of the preferred embodiments of the invention set forth by way of example and shown in the accompanying drawings wherein like reference numbers indicate corresponding parts throughout.

DESCRIPTION OF THE PREFERRED
EMBODIMENTS OF THE INVENTION

While the present invention may be practiced in a number of forms, and its principles applied to dispensing a wide variety of materials, a detailed description of only one application of the invention will be given, namely, generating $CO_2$ as the gas, and mixing and dispensing reactive, foam-forming liquids from individual containers positioned within a master container.

From this, however, it will be realized that the concept of the invention is adaptable to dispensing other products, using somewhat varied forms of guns or like dispensers and that the chemistry of the gas-generating system and the arrangement of certain of its components may also change considerably and still lie within the spirit of the present invention.

As will appear in connection with the description of the illustrated embodiment, the generator and dispenser of the invention is adapted to dispense one or more reactive components under a elevated, comparatively regulated pressure generated by a chemical reaction. More particularly, in the form shown, the apparatus is adapted to form and dispense urethane foams made from a pair of separately packaged, reactive components. The carbon dioxide or ("$CO_2$") gas is generated by the reaction of citric acid and potassium carbonate. The exterior or master containers are made from semi-rigid plastic, and the inner containers, for either liquids or gas, include flexible sidewalls. A chemical trigger is described, and it may be made from rigid or flexible materials. Non-chemical triggers may also be used, as will appear. The dispensing gun preferably, but not necessarily, includes a mixing nozzle removably secured to a valve body, a handle, a trigger, and attachment points for connection to two liquid hoses and a gas hose.

The principles of the invention are not limited, however, to dispensing such foams or even limited to foams at all, but are primarily directed to the concept of providing a self-contained, largely self-regulating pressure source for a gas which serves at least the purpose of dispensing the contents of certain containers. Desirably, it also acts as a propellant for spraying or propelling the contents from the gun to the point of application. The gun and pressure system may also be used, by way of example only, to dispense "pour" foams that are not literally sprayed through the air but emerge from the gun as an expanding liquid stream.

In the particular form discussed, the reactive chemical components include a hydroxyl-rich resin and a isocyanate portion, respectively, which, when combined, create a urethane foam; a finite amount of water is present in the resin for reaction with the isocyanate to generate the auxiliary amount of $CO_2$ actually used in "blowing" the foam. This $CO_2$ is to be distinguished from the $CO_2$ generated by the generator for providing liquid dispensing and propellant functions.

Figure 1:
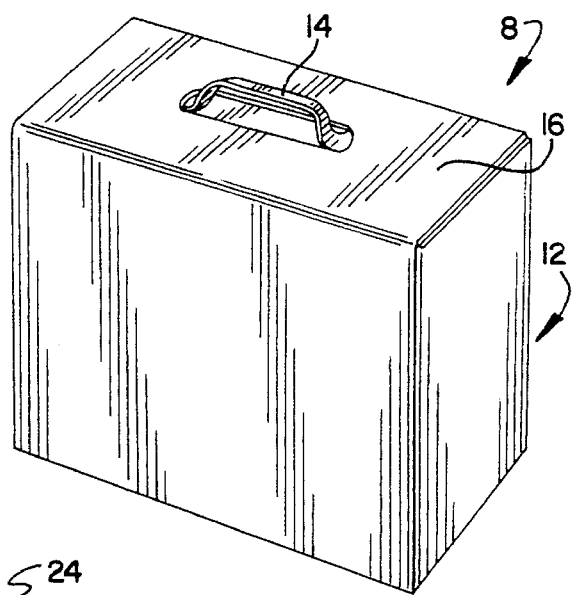
FIG. 1 is a perspective view of a portable package containing the gas-generating and product dispensing apparatus of the invention.
Figure 2:
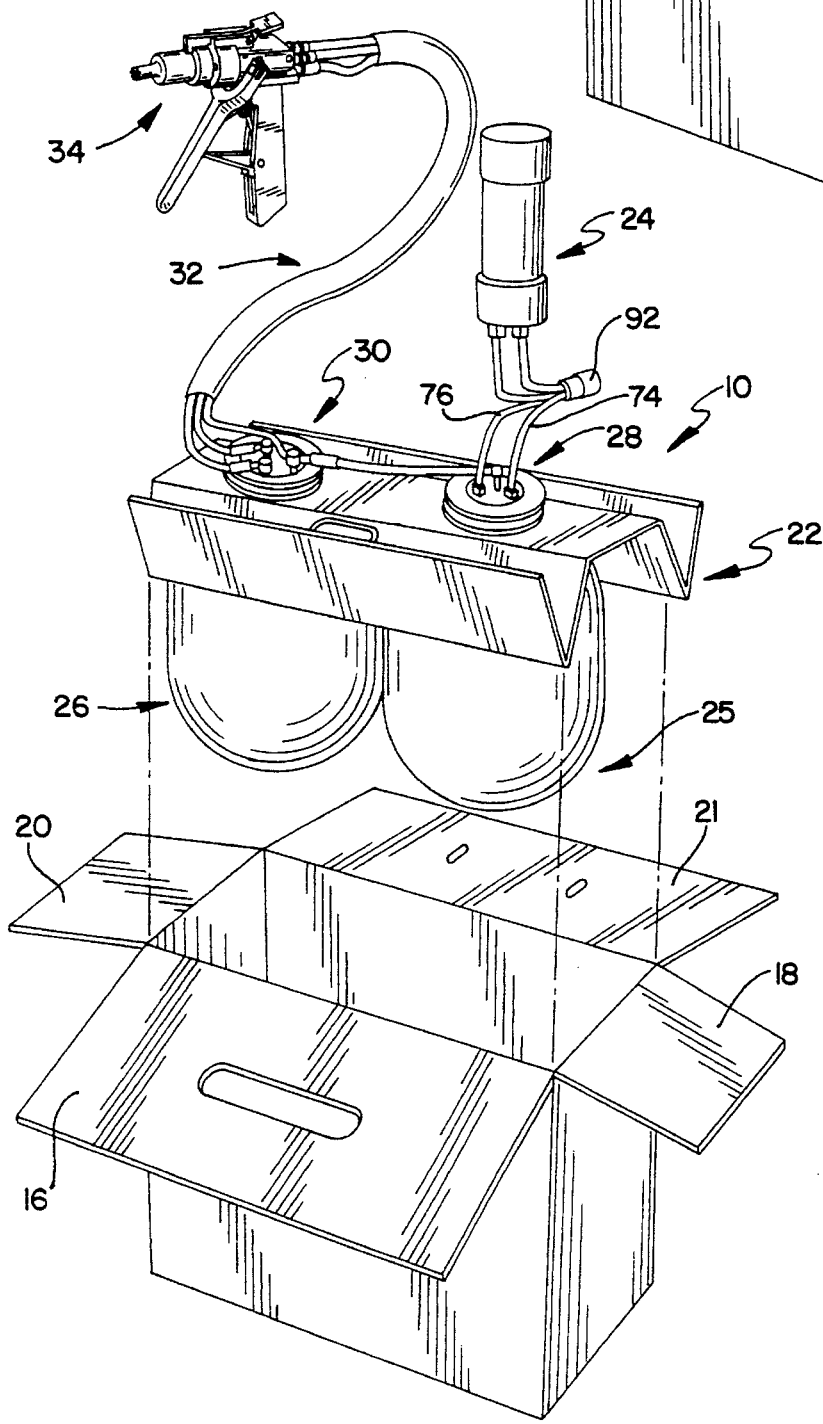
FIG. 2 is an exploded view, showing the principal elements of the generating and dispensing apparatus of the invention and the manner in which the packaged apparatus operates in use.

Referring now to the drawings in greater detail, FIGS. 1 and 2 show one form of package generally designated 8 for a combination gas-generating and dispensing apparatus generally designated 10. The package 8 is shown to include a relatively rigid outer box generally designated 12 having a handle 14 extending through a top cover flap 16. According to the invention, the generating and dispensing system 8 of the invention is able to be stored and shipped in the box 12 and the components, except for the chemical trigger and the actual dispensing gun, remain in place in the container throughout the period of use. With slight, non-inventive design modifications, the trigger could remain in the carton or box 12 in use.

Referring now to FIG. 2, it will be seen that the box 12, when opened, includes closure flaps 18, 20, and 21, in addition to the top flap 16 and that a combination divider/container neck locator generally designated 22 is provided. Referring again to FIG. 2, the principal components of this embodiment of the invention include a chemical trigger generally designated 24, a gas-generating master container generally designated 25, and a product-retaining master container generally designated 26. Container tops generally designated 28, 30 cover the containers and include various hoses and fittings including a composite hose generally designated 32 leading to a dispensing gun generally designated 34.

Figure 3:
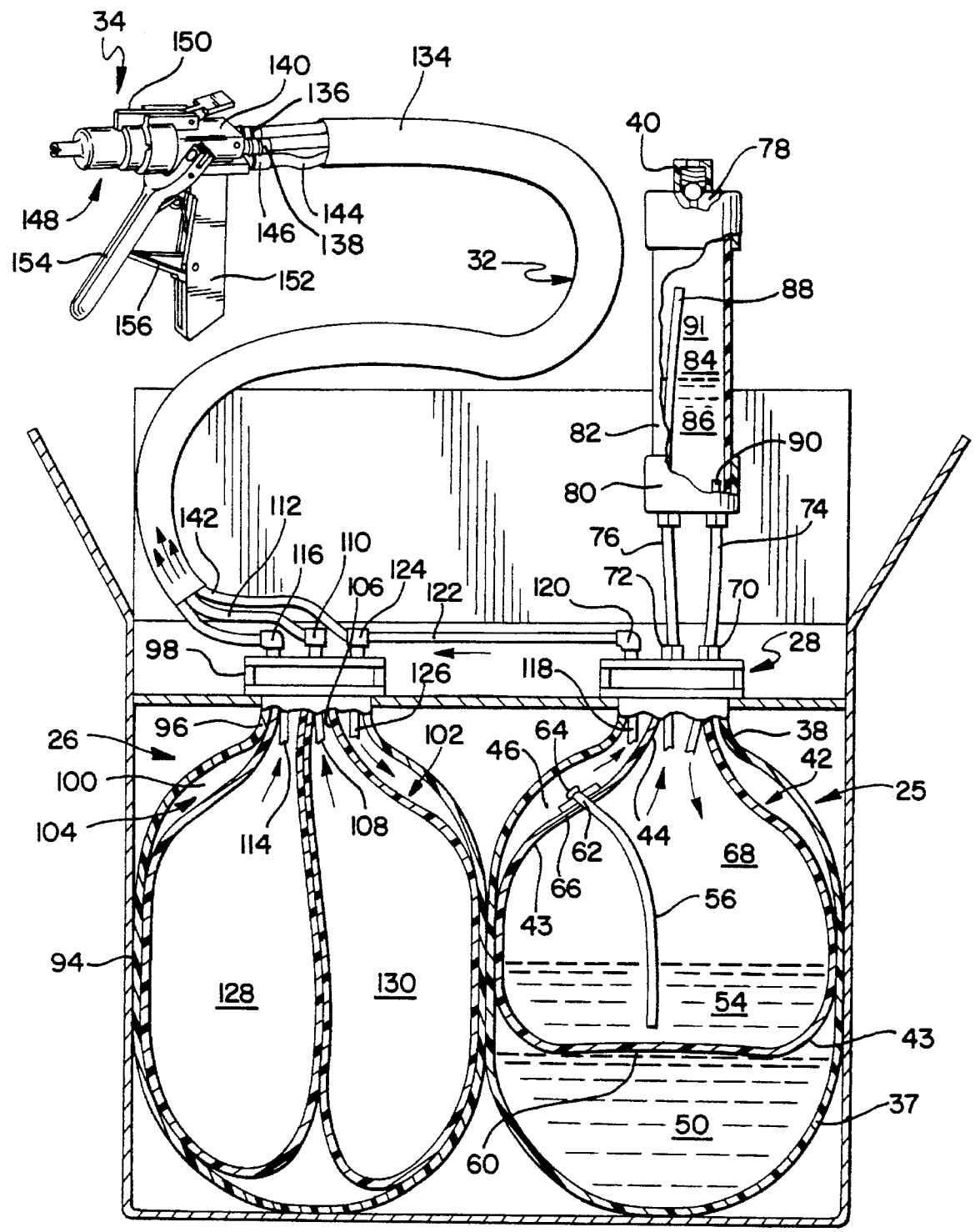
FIG. 3 is an enlarged side view, partly in elevation and partly in section, showing the elements of the gas-generating and liquid dispensing apparatus in greater detail.

Referring now to FIG. 3, it will be seen that the first gas-generating master container 25 includes an outer wall 37, and that its neck portion 38 is secured to the closure generally designated 28. Disposed within the gas-generating container 25 is an inner liquid container generally designated 42 and having flexible sidewalls 43. This container 42 also includes a neck portion 44 secured to a portion of the closure 28 and kept isolated from the headspace or pressurizable area 46 lying between the flexible walls 43 of the inside container 42 and the walls 37 of the outside container 25.

In keeping with the invention, the wall portions 37 of the outer container 25 define an interior area for reception of a charge 50 of a mild acid solution. In the preferred form, this is 2 liters of a 50% citric acid in water solution. The inner bag 42 with the flexible sidewalls 43 preferably includes 1.5 liters of a liquid 54, in this case a 50% solution of potassium carbonate in water. The potassium carbonate or salt solution should occupy 25% or less of the total volume of the bag 42, the remainder being available for headspaces 68. Thus, the master container 25 is an acid container and the inner container 42 is a salt bag.

A dip tube 56 with a hollow center and an open lower end portion 58 lying near the bottom wall 60 of the inner container 42 is provided. The upper end 62 of the dip tube 56 is fitted with a rupturable, low pressure seal 64 in the form of an adhesively affixed cover secured to a margin 66 of the inner or salt bag outer sidewall 43. The dip tube 56 thus provides a path of communication between the headspace 46 and the interior or headspace 68 of the inner bag 42, through the liquid 54.

Referring to the closure 28 for the containers 25 and 42, it will be noted that there are fittings 70, 72 thereon securing supply and return hoses 74, 76 from container 42 to the chemical trigger 24. The trigger 24 includes end caps 78, 80 and a cylindrical body 82, defining an interior space 84 in which a predetermined volume of liquid trigger acid 86, typically citric acid, is disposed. The tube 76 operates as a vent tube and consequently, when the trigger is in the position shown in FIG. 3, the upper end 88 of the tube 76 will lie above the level of the liquid 86, while the upper end 90 of the supply tube 74 lies beneath the level of the liquid 86. Thus, the trigger includes its own headspace 91 and a portion 86 devoted to liquid, as do the other liquid containers 25, 42.

As shown, for safety purposes, the chemical trigger includes a spring-loaded ball check pressure relief valve 40 in the upper end cap 78.

Referring now to FIG. 2, it will be noted that the supply and return hoses 74, 76, are capable of being crimped or folded over so as to close them off, and that such hoses may be retained in this position by a clamp such as the simple clamping 92. In other words, if the hoses are folded over and the cylinder 92 is placed over them to maintain them in a crimped relation, the effect is to prevent liquid or gas flow through the hoses 74, 76.

Referring now to the master product container 26, this unit is preferably comprised of an at least semi-rigid sidewall portion 94, and an upper margin or collar 96 to which the closure fitting 30 is secured. According to the invention, a pressurizable interior headspace 100 lies within the container 26 and outside the space occupied by first and second liquid product bags or pouches generally designated 102, 104, respectively. Pouch 102 has an upper margin 106 surrounding an outlet tube 108 which extends through a fitting 110, and to an exterior hose 112. The same is true of the other bag or pouch 104, which includes an outlet tube 114 extending into it from the end of a fitting 116, positioned on the closure 30.

The headspace 100 is pressurized by gas passing from the headspace 46 of the container 25 through the tube 118, the fitting 120, the transfer tube 122, and the fitting 124, and the gas inlet tube 126. The pressure in the headspace 100 acts on and tends to collapse the interiors 128, 130 of the bags 100, 102, causing the products in them to flow through the tubes as aforesaid and into the composite hose 32.

The far or gun end 134 of the composite hose 32 ends in fittings 136, 138, each secured to the valve body 140 of the gun generally designated 34. According to the invention, the transfer tube 122 for the gas is also in communication, through line 142, to the composite hose 32. An end portion 144 of the gas tube 142 terminates in a fitting 146 which is also secured in gas-tight relation to the valve body 140 of the gun 34.

As shown, the gun includes a removable nozzle generally designated 148 and held in place by a mechanism 150 acting as a combined nozzle latch and ejector. The gun 34 typically further includes a handle 152, a trigger 154 and a trigger safety 156.

Operation of the gun is generally conventional and, with the exception of the provision of the gas fitting, may operate in the same manner as the gun described and claimed in U.S. Pat. No. 4,676,437, for example.

The exact form of dispensing gun is not a critical portion of the present invention, but is preferably a form of gun which is advantageously used with the invention.

Preferably, the gas is used not only to pressurize the headspace of one or more master containers for dispensing liquid components, but is also used as a part of the propellant for the product to be dispensed. In any instance wherein the gas is put to this use, a two or three component gun—one or two liquid passages and one gas passage—has proven to be very advantageous.

Referring now to the preferred form of utilizing the combination gas-generating and product dispensing apparatus 10 of the invention, it will be assumed that the product is packaged as illustrated, except for the position of the chemical trigger. In this connection, for shipping and storage, preferably, the supply hoses 74, 76 are folded over and secured by the cylindrical clamp 92. At this point, the trigger is preferably inverted with respect to its position in FIG. 3, so as to lie in the portion of the container below the divider 22 and adjacent the individual containers 25, 26. The chemical trigger 24 contains the citric acid solution as described, but is isolated from the other contents because its supply is crimped. This solution exhibits no measurable gas pressure and requires no particular shipping precautions.

As was pointed out, the respective interiors 46, 68 of the master and salt containers 25, 42 each also contains a liquid. The liquid 54 is a salt such as potassium carbonate and the liquid acid 50 is a citric acid, by way of example only. These products are isolated from each other by the bag walls and by the fact that the seal 64 over the upper part 62 of the dip tube insures that these liquids do not mix with each other. The cap 64 is rupturable by pressure, but is secured against leakage during any time the pressure in the headspace 68 is modest. Accordingly, the two liquid just discussed will not mix with each other and the pressure in all headspaces is substantially atmospheric.

Referring to the other semi-rigid container master 26, this container simply accommodates individual, non-pressurized but reactive components which are kept separate from each other by the walls of their containers. The bags may be single or multi-layer plastic bags, with or without a metalized finish. At any rate, the bag materials are selected so as to be substantially impermeable with respect to the products contained therein, so the products can be kept separate and protected from moisture or other contamination during storage and shipment. The interior or headspace 100 of the container 26 is likewise not subject to pressure during shipment and storage.

Assuming now that it is desired to operate the apparatus, after it has been shipped as described, assuming that the product is ready to be used, a throw-away type nozzle 148 is inserted into the gun 34. The chemical trigger assembly 24 is removed from the divider in the box and positioned as shown in FIG. 2. Thereupon, the clamp 92 is removed and the chemical trigger 24 is raised sufficiently to release the crimp in the supply and return hoses 74, 76. Gravity then causes the liquid acid 86 in the interior 84 of the chemical trigger to begin flowing through the tube 74 into the headspace 68 of the container 42. The initial reaction rapidly begins generating carbon dioxide, which inflates the bag 42 and also passes through the return tube 76 to the headspace 84. The equalized headspace pressures permit the remaining liquid 86 to empty rapidly into the interior of the inner bag 42, generating a pressure determined by the amounts of chemicals, and the size of the containers and their headspaces. The chemical trigger contains only a small part of the total available acid.

As this pressure increases, and bearing in mind that the headspace 46 is not yet pressurized, the bag 42 continues to expand, forcing liquid 54 upwards in the dip tube 56 towards the seal 64. When the pressure differential is high enough, such as 4–6 psi, the seal 64 ruptures and permits liquid salt solution 54 to flow out the opening in the dip tube, along the bag sidewalls and finally down into the reservoir of acid 50. This reaction immediately begins generating more $CO_2$, which appears as a positive pressure in the headspace 46. Assuming a significant differential pressure between the containers 25 and 42, a significant portion of the liquid dosing salt 54 is immediately supplied into the acid 50, causing a volume of gas to be generated that is proportional to the amount of dosing liquid 54 supplied at that time.

At this point, and bearing in mind that the headspace 46 is in communication with the headspace 100, a reference or initial operating pressure, which is important to the operation of the mechanism as a whole, has been set. Thus, the trigger caused initial dosing to occur and the amount of dosing was determined by initial pressurization of the inner bag 42. This pressure dosed until such pressure was equalized by the headspace pressure in the two master containers, whereupon dosing stopped and the reference pressure was set. During the operation, it is assumed that the gun is not manipulated, so that all conditions are in a preset equilibrium.

Assuming now that it is desired to operate the system, the trigger 154 is manipulated to dispense products from the containers 128, 130. The referenced pressure in the headspace causes the contents 128, 130 of the bags to be emptied. The gun manipulation also discharges additional $CO_2$ from one or both headspaces 64, 100 through the gas hose, initially lowering the system pressure.

However, when the above referenced usage of gas from the headspace 46 begins to lower the pressure in headspace 46, the now comparatively higher pressure in the headspace 68 causes more gas-generating liquid 54 to pass through the dip tube 56. This action is sometimes referred to as "dosing" the liquid 50 inasmuch as an additional "dose" of reactive salt solution 54 is added to salt solution 50.

This condition then causes a repetition of the original pressurizing action, with a higher pressure in space 46 tending to cut off additional salt flow, and a lower pressure in the headspace 46 causing additional dosing of the liquid with a concomitant increase in pressure. Thus, a self-regulating action tending towards equilibrium with the reference pressure is achieved.

In successful applications, examples of operating pressures of 30–90 psi have been examined, with 40–70 psi being ideal for dispensing some products. In this connection, hose or tubing sizes for the liquids and the gas are selected by those skilled in the art with reference to expected pressures and liquid and gas delivery rates.

The arrangement just discussed has proven highly advantageous. A compact gas-generating system is provided which is sufficient to dispense approximately 10 lbs each of reactive liquid ingredients. These materials, when applied to a substrate and permitted to achieve a free rise density of 1.1 to 3 lbs per cubic foot, for example, will produce some 80 to 200 board feet of finished foam. Calculations and tests have indicated that, using 11 lbs. of isocyanate and 8 to 9 lbs. of resin, these amounts of liquid can be mixed and dispensed by approximately 90 liters of gas, measured at or just above atmospheric pressure. This corresponds to some 18 to 20 liters of gas at 70–80 psi. Bearing in mind that each atmosphere is just less than 15 psi, gas at some 72–75 psi will expand to five times that volume as the pressure drops to 1 atmosphere.

As pointed out, the advantages of the invention are numerous. In dispensing foams from throwaway kits, the materials may be made very economically. The trigger may be made from components such as polyvinyl chloride (PVC) pipe in a two to three inch diameter. Plastic and/or rubber hoses of the type conventionally used in throwaway urethane-forming kits may be used and a similar, substantially all plastic throwaway gun may be utilized, suitably modified to use a generated gas supply as the propellant. One such form of gun is described in co-pending U.S. patent application Ser. No. 08/264,640, filed Jun. 23, 1994.

The advantages of using separately confined reactable products with little or no toxicity and, particularly, products encountering or developing no pressure during shipment and storage, are numerous, and include reducing cost and providing freedom from environmental worries and elevated freight and/or storage costs. The foam products dispensed using the apparatus of the invention have proven fully the equal of prior art products dispensed using environmentally objectionable materials such as freon, which requires all metal, expensive, pressure-resistant containers. The invention advantageously uses an essentially self-regulating mechanism for pressure control, i.e., controlling dosing and reaction to the difference between the interior and the exterior pressures of two interconnected, flexible walled containers. This provides relatively constant dispensing rates, also.

As pointed out, a number of different products may be advantageously mixed and dispensed using this system. The system is very advantageous in that the generated gas may serve the dual function of pressurizing the dispensing container and also serving as the propellant when supplied through separate hoses and fittings.

In the forms of apparatus shown, the master container 26 includes two interior liquid product bags. Naturally, three or more product bags could be placed in such master container if this were desired for some reason.

Still further, two or more master separate containers could be provided, each with one or more separate, individual bags for liquid or fluent products. Thus, the headspace in each of two containers could be pressurized by the gas-generator and the products respectively would be dispensed from each master container. It is normally desired to simply use one master container for two or more separately bagged dispensable ingredients, however.

Likewise, if two master containers were used, and a suitable arrangement of headspaces and/or dip tubes were provided, it would not be necessary to place bags in the individual master containers, provided that the gas, such as the $CO_2$, were not measurably soluble in the liquid to be dispensed. Thus, sometimes simply pressurizing a headspace above a liquid having a dip tube will be sufficient to achieve the purposes of the invention. The selection of two master containers as opposed to one is a decision that is to be arrived on the basis of economics rather than purely technical considerations.

By the same token, regarding the master container 25, the salt bag is shown disposed inside a master containing the liquid citric acid solution. Other arrangements achieving the same effect might be made, provided that there is sufficient inter-communication to achieve the dosing and regulating functions. Disposing the salt bag inside the master container with the citric acid and having the trigger positioned exteriorly to both but in communication with the inner bag only is a presently preferred form of apparatus, but not the only arrangement which could utilize the triggering, dosing, gas-generating and pressure regulating aspects of the invention.

Needless to say, the gas-generating chemicals could be arranged differently, or other chemicals altogether could be used.

In the above description, it has been assumed that a chemical trigger has been described. However, it will be understood that, since the function of the trigger is merely to set a reference pressure in the dosing container, this might be achieved by other means. For example, a small $CO_2$ cartridge of a conventional type could be pierced and the $CO_2$ used to provide initial pressurization of the inner bag and an initial dosing action to take place.

Likewise, a trigger could be made simply utilizing an air supply tube with a check valve or the like, initially using a compressed air or other gas source to initiate dosing and supply a predetermined pressure and the dosing bag.

Referring again to this inner dosing bag, 42, it is presently preferred, for closer pressure regulation, i.e., less pressure regulation and to avoid significant pressure variations in this bag, that a headspace of at least 75% of the container volume be provided. In other words, if the inner bag 42 had as extremely small headspace and were triggered with a comparatively large dose of acid, a small headspace could cause a very high pressure rise which might over-dose the master container liquid. Hence, because a moderate pressure, which decreases only slightly during the time the dosing liquid is being exhausted is preferred, generous headspace should be provided in the bag 42.

It will thus be seen that the present invention provides a novel combination gas-generating and product dispensing system having a number of advantages and characteristics including those expressly pointed out here, and others which are inherent in the invention. An illustrative example of the product of the invention having been described, it is anticipated that variations to the described form of apparatus will occur to those skilled in the art and that such modifications and changes may be made without departing from the spirit of the invention, or the scope of the appended claims.

We claim:

1. An apparatus for dispensing chemical products, said apparatus comprising, in combination, a first master container having a given interior volume and having disposed therein at least a first, flexible walled product container for a chemical product to be dispensed, said containers being arranged so that a first pressurizable headspace is formed between the interior of said first master container and the exterior of said product container; and an inlet for directing gas from a pressure source to said first pressurizable headspace; a gas-generating apparatus including a second master container having disposed therein a quantity of a first liquid, which when mixed with a second fluent substance will react to generate a gas, a second headspace above said first liquid, a second container having a second fluent substance disposed therein and a third headspace above said second fluent substance, said second fluent substance being reactive with said first liquid to create said gas; a feed system responsive to pressure differentials between said second and third headspaces, including a conduit for supplying said second fluent substance from said second container to said second master container, means for initially pressurizing said second container, a dispensing gun with valves controlling liquid and gas flow therethrough, and fluid-tight connections permitting fluid flow between said product container and said gun, and gas flow between said second headspace and said gun, and between said second headspace and said gas inlet in said first master container.

2. An apparatus as defined in claim 1 wherein said second container is disposed within a part of the headspace of said second master container.

3. An apparatus as defined in claim 1 wherein said first liquid comprises a solution of citric acid and wherein said second fluid substance comprises an aqueous solution of potassium carbonate.

4. An apparatus as defined in claim 1 wherein said means for initially pressurizing said second container comprises a chemical trigger, said chemical trigger including chemicals reactive with said second fluid substance to create a gas.

5. An apparatus as defined in claim 1 wherein said means for initially pressurizing said second container comprises a connection to a source of pre-pressurized gas.

6. An apparatus as defined in claim 1 wherein said feed system includes a tube extending from the interior of said second container to the interior of said second master container, and wherein said tube includes a seal rupturable at low pressure.

7. An apparatus as defined in claim 1 wherein said means for initially pressurizing said second container comprises a chemical trigger in the form of a sealed tube with a pressure relief vent therein, said sealed tube including an aqueous solution of a material reactive with said second fluid substance to create a gas.

8. An apparatus as defined in claim 1 wherein said at least a first flexible walled product container comprises first and second flexible walled product containers.

9. An apparatus as defined in claim 1 wherein said generated gas is carbon dioxide.

10. A mixing and dispensing apparatus for reactive liquid chemical products, said apparatus including a dispensing gun having a pair of liquid inlets, a gas inlet, a mixing nozzle, a dispensing trigger, valves operated by said trigger for permitting said reactive liquid products and said gas to be mixed in and dispensed from said gun nozzle under the force of a gas propellant, said apparatus including a first master container having its interior volume divided into at least a first headspace and a space accommodating at least two individual product forming liquid chemical containers, each of such product forming liquid chemical containers having flexible walls and each of said product forming liquid chemical containers also having an individual outlet passage, said first master container also including a gas inlet to permit pressurizing said first headspace for dispensing the contents of said product forming liquid chemical containers, a gas generator comprising a second master container having its interior occupied in part by a gas generating liquid, and having a second headspace above said gas generating liquid, said gas generator also including a dosing container, said dosing container including a third headspace and supply of dosing liquid therein, said dosing liquid and said gas generating liquid reacting to generate a gas, a conduit for directing liquid from said dosing container into said second master container in response to a pressure difference in said second and third headspaces, a trigger comprising means for supplying initial pressure to said dosing container, and at least two liquid product hoses connected at their respective ends to said dispensing gun liquid inlets and to said individual outlet passages of said individual product forming liquid chemical containers, said apparatus further including a gas supply connection between said first and second master container headspaces, and between one of said master container headspaces and said gas inlet on said dispensing gun, whereby triggering said dosing container raises the pressure in said third headspace and forces dosing liquid into said second master container, said gas generating liquid thereupon generating gas for supplying said gun and pressurizing said first and second master container headspaces and with said dosing container thereafter responding to a lowered pressure in said second headspace by adding more dosing liquid to said gas generating liquid.

11. A mixing and dispensing apparatus as defined in claim 10 wherein said product forming liquid chemical containers include the constituents necessary to produce a synthetic plastic foam.

12. An apparatus as defined in claim 11 wherein said generated gas is carbon dioxide.

13. An apparatus as defined in claim 11 wherein said trigger comprises a chemical trigger having a supply of material reactive with said liquid in said dosing container to produce a gas for dosing said dosing liquid into said gas generating liquid to bring said system to its reference pressure.

* * * * *